April 14, 1936.  A. H. LEAK  2,037,384
CONNECTING ROD
Filed Oct. 27, 1934  2 Sheets-Sheet 1
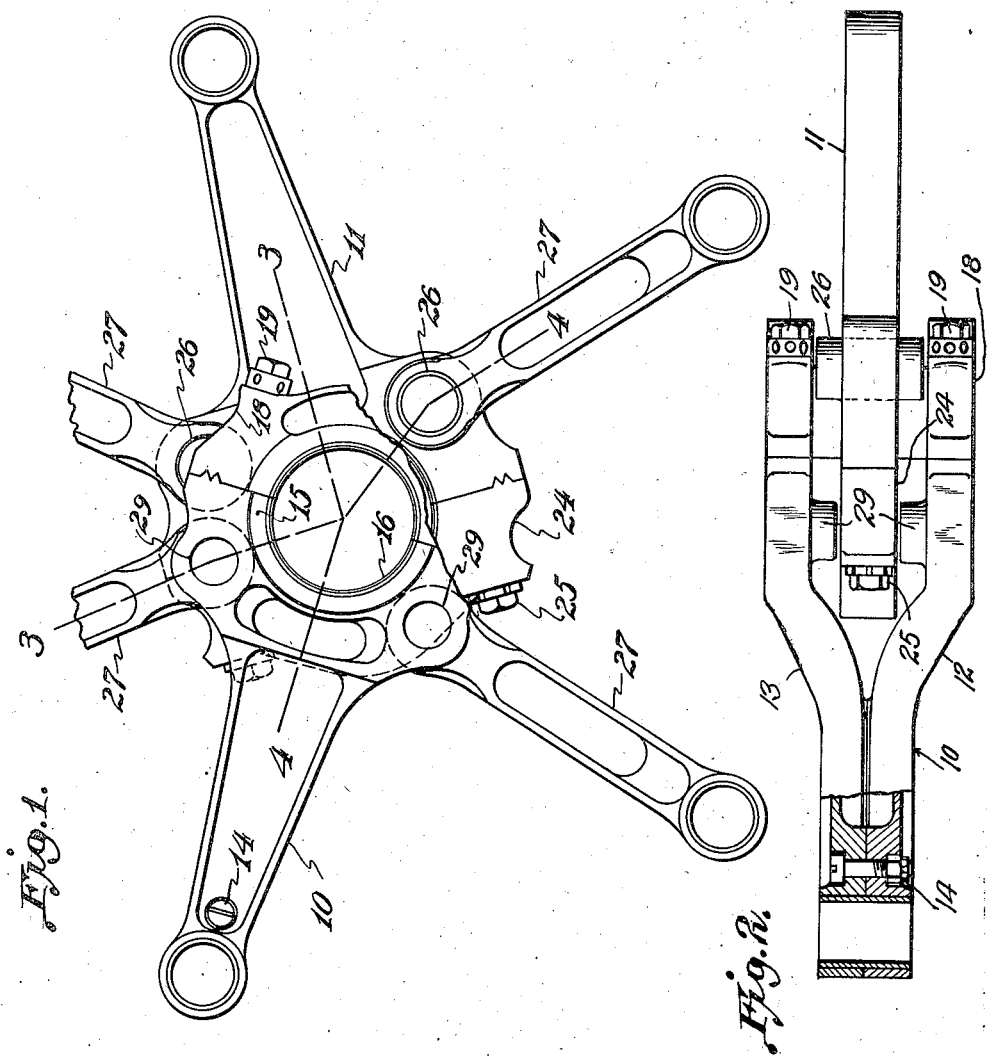
INVENTOR.
ARTHUR H. LEAK April 14, 1936.  A. H. LEAK  2,037,384
CONNECTING ROD
Filed Oct. 27, 1934   2 Sheets-Sheet 2
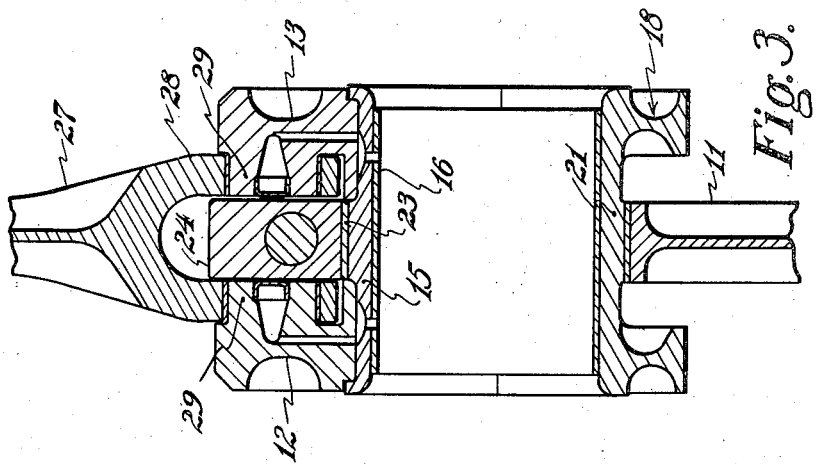
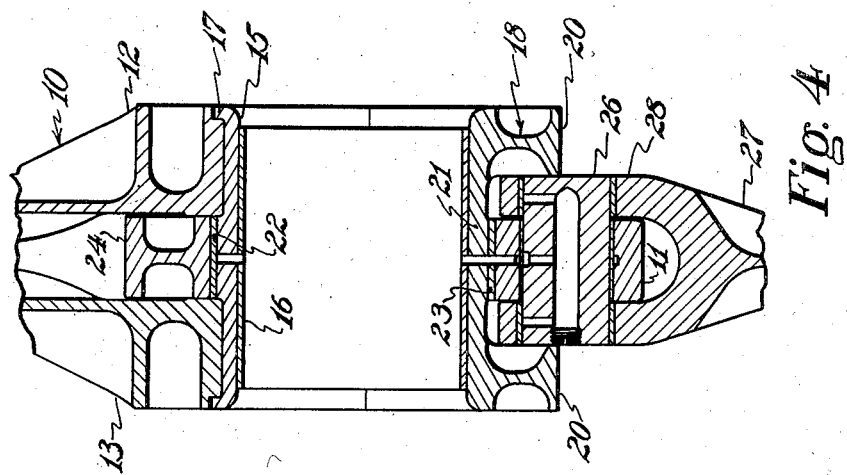
INVENTOR.
*ARTHUR H. LEAK*
BY
ATTORNEY.

Patented Apr. 14, 1936

2,037,384

UNITED STATES PATENT OFFICE 2,037,384

CONNECTING ROD

Arthur H. Leak, Ramsey, N. J., assignor, by mesne assignments, to The Reed Propeller Co., Inc., Garden City, N. Y., a corporation of New York Application October 27, 1934, Serial No. 750,290

7 Claims. (Cl. 74—580)

This invention relates to connecting rods for radial engines and the specific showings of the drawings illustrate a rod suitable for aircraft engines.

Objects of the invention are to provide improved structural strength in a duplex master rod such as described in my Patent No. 1,962,246, wherein there is disclosed a rod system employing two master rods serving opposed cylinders and each carrying knuckle pins for link rods serving adjacent cylinders. The knuckle pins in each master rod are placed near the shank whereby the angularities of the link rods are reduced as compared to the conventional rod wherein the knuckle pins are placed all around the master rod end. In the conventional construction, there is a large variation in the path of travel of the knuckle pins on the opposite side of the master rod end from the shank and this error causes corresponding errors in piston travel and balance.

In the present invention a blade master rod is embraced by a forked master rod, these rods respectively serving opposed cylinders of the engine. The blade master rod is provided with knuckle pins upon which forked link rods are adapted to engage. The side plates of the forked master rod are provided with opposed, stub, inturned knuckle pins, upon which link rods similar to those engaging the blade rod are carried. Thus, all of the link rods straddle the blade master rod, some link rods being carried by the blade master rod, and others being carried by the forked master rod.

An object of this invention is to provide a construction in which adequate strength, rigidity and bearing surface are provided in the knuckle pins of a fork and blade master rod construction.

A further object is to provide a connecting rod system involving a fork and blade master rod and a plurality of identical forked link rods, certain of the link rods engaging the forked master rod, and certain other of the link rods engaging the blade master rod.

A still further object is to provide a connecting rod construction wherein maximum bearing areas for the master rods and link rods are provided within relatively small compass.

Further objects will be apparent from reading the annexed specification and claims, and in viewing the drawings, in which:

Fig. 1 is an end elevation of the rod assembly, showing the several rods in positions of the maximum angularity to which they would be subjected in service;

Fig. 2 is a plan of the master rods in aligned relationship, the piston end of one master rod being shown in section; and Figs. 3 and 4 are sections on the lines 3—3 and 4—4 of Fig. 1, respectively.

A forked master rod 10, at its big end, embraces a blade master rod 11, the forked master rod comprising similar separable halves 12 and 13 joined at their piston ends by a bolt 14 and engaging at their big ends with a semi-cylindrical bushing 15 having a bearing 16 for engagement with the crank-pin (not shown). Flanges 17 on the bushing 15 serve to hold the rod halves 12 and 13 in their proper relationship. An integral bearing cap 18 is provided for the forked rod 10, being bolted thereto as at 19, the bolts passing through flanges 20 formed at opposite ends of a central web portion 21, the inner surface of the web portion engaging the crankpin bearing 16. The bearing cap serves as the means for anchoring the rod halves 12 and 13 together at their crank-pin ends. An annular journal surface 22 is formed around the web 21 and the bushing 15 to receive a bearing element 23 upon which the blade rod 11 may oscillate. Said blade rod is provided with a cap 24 attached to the rod 11 by bolts 25.

The blade rod 11 is provided with knuckle pins 26 extending on each side of the rod and terminating within the confines of the flanges 20 of the complete forked master rod. Upon these pins, link rods 27 are journaled, said link rods having forked ends as at 28 which embrace the blade rod 11. The respective sides of the big end of the forked rod 10 are provided with inturned, stub knuckle pins 29 which clear the blade master rod cap 24. Additional link rods 27 are borne upon the stub knuckle pins 29 so that the fork of said link rods embraces the blade master rod cap 24 and, in turn, is embraced by the big end portions of the forked master rod 12.

Assembly of the link rods to the forked master rod is accomplished by inserting one fork of each link rod 27 over one of the stub pins 29 of one of the halves 12 or 13 of the forked master rod, whereupon the other half 13 or 12 of the forked master rod is assembled. Thereafter, the bolt 14 is applied and the fork rod bearing cap 18 serves to hold the two halves of the forked master rod at the big end thereof.

It will thus be seen that free oscillation of the two master rods with respect to each other, and of the link rods with respect to the master rods is permitted. As above mentioned, all of the link rods are similar in form, permitting greater ease and less complexity in fabrication. Loads upon those link rods which are attached to the forked master rod are transmitted to the crankpin through the forked master rod, through the bushing 15 and through the bearing 16. Loads upon those link rods which are attached to the blade master rod are transmitted through the blade master rod 11, through the bearing 23, thence to the forked rod bearing cap 18, through the bearing 16 to the crankpin.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A connecting rod system for a radial engine comprising in combination a blade master rod, knuckle pins extending therefrom, a forked master rod comprising demountable halves, opposed knuckle pins extending integrally and inwardly from said halves, and forked link rods engaging said knuckle pins.

2. In an engine having radial cylinders, a rod assembly comprising a master rod having a forked crankpin end, a master rod having a blade crankpin end disposed within said fork, knuckle pins on the respective rod ends, and link rods mounted for oscillation on said knuckle pins, said forked end rod comprising two similar and demountable side portions.

3. In an engine having radial cylinders, a rod assembly comprising a master rod having a forked crankpin end, a master rod having a blade crankpin end disposed within said fork, knuckle pins on the respective rod ends, link rods mounted for oscillation on said knuckle pins, said forked end rod comprising two similar and demountable side portions, and a bearing cap member secured to said sides.

4. In an engine having radial cylinders, a forked master rod cooperating with a blade master rod, said forked master rod comprising demountable halves each having stub knuckle pins projecting inwardly therefrom, and forked link rods having bearings for engagement with said stub knuckle pins.

5. In an engine having radial cylinders, a blade master rod, forked link rods articulated thereon, a master rod having forked ends embracing said blade rod and said link rods, stub knuckle pins projecting inwardly from said forked ends toward the embraced blade rod, and additional forked link rods journaled on said knuckle pins and embracing said blade master rod.

6. A connecting rod system for a radial cylinder engine comprising, in combination, a blade master rod, a forked master rod embracing said blade rod, and a plurality of similar forked link rods, certain of said link rods being articulated to said blade rod and others of said link rods being articulated to said forked master rod, all said forked link rods embracing said blade master rod.

7. A connecting rod system for a radial engine comprising in combination, a blade master rod having forked link rods journaled thereon, and a forked master rod embracing said blade rod and link rods and having forked link rods journaled thereon, said last named link rods embracing said blade master rod.

ARTHUR H. LEAK.